United States Statutory Invention Registration [19]

[11] Reg. Number: H449

Rudesill [43] Published: Mar. 1, 1988

[54] CATALYST COMPOSITIONS

[75] Inventor: John A. Rudesill, Baltimore, Md.

[73] Assignee: W. R. Grace & Co., New York, N.Y.

[21] Appl. No.: 81,554

[22] Filed: Jul. 31, 1987

Related U.S. Application Data

[63] Continuation of Ser. No. 819,777, Jan. 16, 1986, abandoned.

[51] Int. Cl.[4] ..... B01J 29/06; B01J 29/08; C10G 11/05

[52] U.S. Cl. ..... 502/67; 502/68; 208/120

[58] Field of Search ..... 502/67, 68, 71

[56] References Cited

U.S. PATENT DOCUMENTS

| | | | |
|---|---|---|---|
| 4,107,088 | 8/1978 | Elliott, Jr. | 502/68 |
| 4,289,606 | 9/1981 | Gladrow et al. | 208/120 |
| 4,309,279 | 1/1982 | Chester et al. | 502/67 |
| 4,415,438 | 11/1983 | Dean et al. | 502/68 |

*Primary Examiner*—John F. Terapane

*Assistant Examiner*—J. E. Thomas

*Attorney, Agent, or Firm*—Arthur P. Savage

[57] ABSTRACT

Catalytic compositions comprising up to about 50 weight percent ZSM-5 zeolite dispersed in an attrition resistant, porous inorganic oxide matrix selected from silica-alumina cogels, silica, alumina and silica alumina sol bound clay. The compositions are combined with zeolitic containing catalytic cracking catalysts and used to convert residual and/or gas oil hydrocarbon feedstocks into lower molecular weight products that include high octane gasoline fractions.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATALYST COMPOSITIONS

This is a continuation of application Ser. No. 819,777, filed Jan. 16, 1986, now abandoned.

The present invention relates to the manufacture of catalysts, and more particularly to the manufacture and use of zeolite containing hydrocarbon conversion catalysts that are particularly selective for the production of high octane gasoline fractions.

Zeolite containing catalysts are used to convert high molecular weight hydrocarbon feedstocks such as residual gas oils to products of increased value such as gasoline and diesel fuel. In particular, fluid catalytic cracking catalysts which contain synthetic faujasite, Type Y zeolites and modified versions thereof such as ultrastable type Y zeolite (USY) and rare earth exchanged type Y zeolite (REY) as well as calcined rare earth exchanged type Y zeolite (CREY) have been used by the refining industry for many years.

More recently significant demand has developed for a cc catalyst which will produce substantial yields of gasoline which have high inherent (non-leaded) octane rating. In U.S. Pat. Nos. 3,758,403, 3,994,800, 4,239,654 and 4,289,606 FCC catalysts which contain USY zeolite as well as ZSM-5 zeolite have been identified as "octane enhancing catalysts".

While FCC octane enhancing catalysts are available which will produce gasoline fractions of increased octane rating, it is often found that the existing octane catalysts are expensive and in some instances lacking in desired activity, and yield producing characteristics. In particular, it is frequently observed that decreased gasoline yield is tne trade-off for octane enhancement.

It is therefore an object of the present invention to produce an improved octane enhancing catalyst.

It is a further object to provide octane enhancing FCC catalyst additives which may be used with conventional FCC catalysts in conventional FCC units to produce gasoline fractions of enhanced octane rating.

It is another object to provide methods by which octane enhancing catalysts may be quickly and economically manufactured.

It is still another object to provide a method by which gas-oil and residual oil FCC feedstocks may be quickly and economically converted to products which include cracked gasoline fractions of high inherent octane rating.

These and still further objects of the present invention will be readily apparent to one skilled in the art from the following detailed description and specific examples.

Broadly, my invention contemplates catalyst compositions which comprise ZSM-5 type zeolite combined in an inorganic oxide matrix selected from the group consisting of silica-alumina cogels, silica and silica-alumina sols, alumina sols and preferably clay.

More specifically, I have found that an effective octane enhancing FCC catalyst additive may be obtained by combining from about 5 to about 50 weight percent ZSM-5 zeolite with an inorganic oxide matrix such as silica-alumina cogel, silica, silica-alumina, alumina sol bound clay, and mixtures thereof. The matrix component is particularly characterized by having a (non-zeolite) surface area of about 20 to 400 $m^2/g$ and a total pore volume of from about 0.15 to 0.60 cc/g and more preferably a surface area and pore volume of from about 100 to 400 $m^2/g$ and 0.20 to 0.60 cc/g respectively.

The ZSM-5 component used in the practice of the present invention is well known to those skilled in the art, composition and preparation of which is disclosed in U.S. Pat. No. 3,702,886.

The matrix component which is used to combine finely divided ZSM-5 component to a cohesive, attrition resistant article with FCC catalyst size is disclosed in U.S. Pat. Nos. 4,499,179 (Silica-Alumina Cogel), 3,867,308 and 3,957,689 (Silica and Silica-Alumina Sol Bound Clay), and Canadian No. 967,136 and U.S. Pat. Nos. 4,458,023 and 4,542,118 (Alumina Sol-Bound Clay).

In a typical catalyst preparation procedure, the ZSM-5 component is slurried with water, then combined with an aqueous mixture of silica-alumina cogel and/or silica, silica-alumina or alumina sol binder and clay (preferably kaolin). The mixture is then spray dried at elevated temperatures from about 150° to 550° C. to obtain catalytic particles which have an average particle size (APS) of about 50 to 85 micrometer. The spray dried product is then washed with water and exchanged with dilute ammonium sulfate solution to lower the soda ($Na_2O$) content to below about 0.30 weight percent, and preferably to below about 0.10 weight percent. The washed product is then dried at a temperature of 150° C. to obtain a catalyst product having a total volatic content (TV) of below about 20 percent by weight.

The catalyst additive composition of the present invention may contain from about 5 to 50, preferably from about 15 to 35 weight percent ZSM-5. The inorganic oxide matrix comprises from about 50 to 95 percent by weight of the overall catalyst, and preferably from about 65 to 85 percent by weight. In a particularly preferred embodiment of the present invention, the matrix component comprises from about 15 to 85 weight percent cogel and/or silica, silica-alumina, alumina binder from about 0 to 60 weight percent clay.

The octane enhancing catalyst additive of the present invention is used in conventional fluid catalytic cracking operations wherein a conventional zeolite containing FCC catalyst is contacted with a hydrocarbon feedstock with temperatures on the order of from about 900° to 1400° F. and more preferably from about 900° to 1050° F. to crack the hydrocarbon feedstock to obtain lower molecular weight products such as gasoline and diesel fuel. In a particularly preferred practice of the invention, the ZSM-5 containing catalyst additive is used in combination with a fluid catalytic cracking catalyst which comprises ultrastable type Y zeolite which is disclosed in U.S. Pat. Nos. 3,293,192 and 3,449,070, in combination with a silica or silica-alumina sol/clay matrix which is prepared in accordance with the teachings of U.S. Pat. Nos. 3,867,308, 3,957,689, 4,458,023, 4,542,118 and Canadian 967,136. Preferably, the USY containing octacat catalyst comprises from about 15 to 60 weight percent USY and more preferably from about 35 to 45 weight percent USY. Furthermore, it is contemplated that the ZSM-5 catalyst additive may be utilized in combination with catalysts which contain rare earth stabilized type Y zeolites such as calcined rare earth exchanged type X and Y zeolites (CREX and CREY) which produced in accordance with the teachings of U.S. Pat. No. Re 28,629.

The ZSM-5 containing catalyst additive used in combination with the conventional FCC catalyst is added to the catalyst inventory of the FCC unit in amounts to produce catalyst mixture which contains from about 0.1 to 10 ZSM-5 zeolite, and more preferably from about 1.5 to 5 weight percent ZSM-5 zeolite and more preferably from about 1.0 to 2.0 weight percent ZSM-5 zeolite. The feedstocks which are used with the ZSM-5 catalyst additives/FCC catalyst combination may comprise gas-oil feedstocks which boil in the range of from about 600° to 1000° F., residual feedstocks which contain residual component boiling above about 1000° F. in amounts ranging from about 1 percent up to 30 percent by weight of the FCC feedstock. The products which are obtained by the cracking of these feedstocks comprise gasoline fractions which will typically possess an increased octane rating of from about 1.0 to 6.0 RON and 0.2 to 4.0 MON. Furthermore, it is found the catalysts will produce significant yields of diesel fuel in addition to high octane gasoline fractions with minimal loss of overall liquid yield during the conversion process.

Having described the basic aspects of the invention, the following examples are given to illustrate specific embodiments thereof.

EXAMPLE I

An octane enhancing catalyst was prepared which contained 25% ZSM-5, 20% $SiO_2.Al_2O_3$ sol binder, 55% kaolin (oxide basis) as follows:

1. A 25% solids slurry was prepared with 5.0 pounds of dry oxide basis ZSM-5 in sufficient water to constitute the desired 25% slurry.
2. The slurry in "1" above was acidified to 4.0–4.5 pH using 20% $H_2SO_4$.
3. The silica-alumina sol was prepared containing 4.0 lbs of $SiO_2$ by reacting continuously a stream of 18° Be' sodium silicate at 70° F. in a centrifugal mix pump with 70° F. acid alum containing 35 g/l $Al_2O_3$ and 235 g/l $H_2SO_4$ at a discharge pH of 3.0–3.1.

4. The silica-alumina sol was collected in a 10 gallon vessel under a high shear mixer.
5. The slurry in "2" was added and mixed with the silica-alumina sol in "4".
6. To the slurry in "5" was added with mixing 13.0 lbs of dry powered kaolin. The kaolin was allowed to fully disperse to a smooth slurry.
7. The slurry from "6" was spray dried to give a 60–70 micron average particle size at 12–16% moisture using a wheel atomized parallel flow 10' diameter spray dryer.
8. The spray dried catalyst is reslurried in 120°–150° F. water containing 0.1 lb ammonium sulfate per pound of oxide basis catalyst.
9. The catalyst slurry from "8" is dewatered and rinsed first with a 5% ammonium sulfate solution at 120° F. and then with sufficient 150° F. water to rinse the cake sulfate free.
10. The catalyst cake from "9" is oven dried at 400° to 12–16% $H_2O$ to obtain the desired product.

EXAMPLE II

An octane enhancing catalyst was prepared which contained 25% ZSM-5, 78% silica-alumina cogel (25% $SiO_2$, 75% $Al_2O_3$) as follows:

1. A ZSM-5 slurry was prepared as in Example I.1. containing 5.0 lbs dry basis.
2. A silica-alumina cogel was prepared which contained 11.25 lbs $Al_2O_3$ and 3.75 lbs $SiO_2$ by continuously reacting a 4% $SiO_2$ sodium silicate solution in a centrifugal mix pump with 4% $Al_2O_3$ 1.4 mole ratio sodium aluminate and further reacting this product in a second continuous mixer with acid alum (35 g/l $Al_2O_3$, 235 g/l $H_2SO_4$) to obtain a cogel slurry having a 10.3–10.5 pH. All solutions were maintained at 80°–90° F.
3. The slurry from "2" was collected and combined with the slurry from "1" and mixed well.
4. The slurry from "3" was dewatered on a belt filter.
5. The dewatered cake from "4" was reslurried with water to facilitate pumping.
6. The slurry from "5" was spray dried, washed, and dried as in Example I, steps 7, 8, 9 and 10.

EXAMPLE III

An octane enhancing catalyst was prepared which contained 25% ZSM-5, 15% $Al_2O_3$ binder from aluminum chlorhydrol, 60% kaolin (dry oxide basis) as follows:

1. A ZSM-5 slurry containing 5.0 lbs dry basis was prepared as in Example I.1.
2. The slurry in "1" was acidified to 4.0–4.3 pH with 10% HCl.
3. A slurry was prepared by adding first 13.0 lbs of aluminum chlorhydrol containing 3.0 lbs $Al_2O_3$ to a 10 gallon bucket with a high shear agitator and then adding the slurry from "2".
4. To the slurry in "3" was added 14.1 lbs of dry powdered kaolin and allowed to mix until smooth about 5 minutes.
5. The slurry from "4" was spray dried as in Example I, step 7.
6. A portion of the catalyst from "5" was activated for 2 hours at 1000° F. in a muffle furnace to remove volatiles and fix the binder.

EXAMPLE IV

To illustrate the octane increasing properties of the additive compositions of the present invention, an additive composition of the type described in Example I (Additive 0) was combined with a commercially available FCC cracking catalyst (Octacat) which comprises about 40 percent Ultrastable Type Y zeolite combined with asilica-alumina sol binder and kaolin matrix and used to catalytically crack gas oil having a boiling range of about 400° to 1000° F. A summary of the test results including "Base Case" results obtained using Octacat without Additive 0 is set forth in Table A below:

TABLE A

| | BASE CASE OCTACAT | TEST #1 OCTACAT/ADDITIVE "O" | TEST #2 OCTACAT/ADDITIVE "O" |
|---|---|---|---|
| | OPERATIONS SUMMARY | | |
| CATALYST | | | |
| Gas Oil Feed Rate, BPD | 5551 | 5514 | 5500 |
| Slurry Recycle, BPD | 750 | 600 | 750 |
| Combined Feed Temp., °F. | 510 | 506 | 431 |
| Reactor Temp., °F. | 920 | 920 | 928 |
| Pegen. Dense Temp., °F. | 1290 | 1275 | 1264 |

TABLE A-continued

| | BASE CASE OCTACAT | TEST #1 OCTACAT/ADDITIVE "O" | TEST #2 OCTACAT/ADDITIVE "O" |
|---|---|---|---|
| Regen. Dilute Temp., °F. | 1310 | 1300 | 1287 |
| Flue Gas Temp., °F. | 1290 | 1258 | 1320 |
| Est. Additive "O"in Inv., wt. % | 0 | 6 | 5 |
| Equilibrium Microactivity | 65 | 60[1] | 62 |
| | | YIELD SUMMARY | |
| Conversion, vol. % | 69.0 | 64.7[1] | 68.4 |
| YIELDS | | | |
| $C_2$ minus, wt. % | 1.7 | 1.2 | 1.2 |
| $C_3$, vol. % | 1.4 | 1.1 | 2.0 |
| $C_3$=, vol. % | 5.8 | 6.9 | 6.6 |
| $iC_4$, vol. % | 3.7 | 2.8 | 3.4 |
| $nC_4$, vol. % | 0.5 | 0.9 | 1.1 |
| $C_4$=, vol. % | 7.0 | 7.9 | 8.3 |
| $C_5$+ gasoline (430° F. E.P.) vol. % | 57.3 | 53.1 | 55.4 |
| Octane Number, Research | 90.7 | 93.0 | 92.6 |
| Total Gasoline + Potential Alkylate, vol. % | 77.8 | 76.8 | 79.2 |
| LCO (650° F. E.P.), vol. % | 17.6 | 19.1 | 17.3 |
| Slurry, vol. % | 13.4 | 16.2 | 14.3 |
| Coke, wt. % | 5.1 | 5.0 | 5.7 |

[1]The activity loss, which resulted from lower than typical fresh catalyst additions, was responsible for the lower conversion.

The above examples clearly indicate that the catalytic compositions of the present invention which comprise octane enhancing FCC additives containing ZSM-5 zeolite may be used to produce significantly improved yields of high octane gasoline fractions.

I claim:

1. A catalytic cracking composition which comprises a separate particulate octane-enhancing additive component comprising ZSM-5 dispersed in an inorganic oxide matrix, and a particulate Y zeolite containing catalytic cracking catalyst component, comprising 15 to 60 percent by weight ultrastable y zeolite dispersed in an inorganic oxide matrix.

2. The composition of claim 1 wherein the inorganic oxide matrix for said additive component and said cracking catalyst component is selected from the group consisting of silica-alumina cogels, silica, alumina, silica-alumina sol bound clay.

3. The composition of claim 1 wherein the matrix of said ZSM-5 component comprises alumina sol and clay containing less than about 0.10 percent by weight $Na_2O$.

4. The composition of claim 1 wherein the ZSM-5 component comprises from about 5 to 50 weight percent of said composition.

5. The composition of claim 1 wherein said composition has an average particle size ranging from about 50 to 85 micrometer.

6. The composition of claim 1 wherein said matrix possesses a surface area of from about 20 to 400 $m^2/g$ and a pore volume of from about 0.15 to 0.60 cc/g.

* * * * *